Aug. 23, 1966  H. A. SAVAGE  3,267,959

ANTI-FOULING ANTI-SYPOHONING VALVE

Filed Sept. 25, 1963

INVENTOR.
HARRY A. SAVAGE
BY
Salvatore G. Militana
Attorney

United States Patent Office 3,267,959
Patented August 23, 1966

3,267,959
ANTI-FOULING ANTI-SYPHONING VALVE
Harry A. Savage, Miami, Fla., assignor of fifty percent to Donald W. Barlow, Miami, Fla.
Filed Sept. 25, 1963, Ser. No. 311,506
4 Claims. (Cl. 137—516.11)

This invention relates to check valves but is more particularly directed to anti-fouling anti-syphoning valve.

A principal object of the present invention is to provide a valve which is most effective in the prevention of feed back of liquids that would cause precipitate to form and adhere to the inner surfaces of the valve and thereby foul same.

Another object of the present invention is to provide a valve which is simple in construction and effective in operation and which is anti-fouling, anti-syphoning and positive in action to permit the feeding of a liquid chemical into a body of flowing fluid.

Another object of the present invention is to provide an anti-fouling anti-syphoning valve with a valve seal effected by an O-ring mounted in a groove formed on a valve that engages a cylindrical side wall which is provided with slots to prevent the O-ring from being unseated during movement of the valve to open or closed positions.

A further object of the present invention is to provide an anti-fouling, anti-syphoning valve with an O-ring seal positioned in a discharge chamber having slotted side walls to permit a reduced discharge of fluid at the initial opening of the valve to prevent unseating the O-ring as the valve moves to its completely open position and as the valve moves to its seated position the discharge fluid is first reduced to that flowing through the slotted side walls and then cut off completely when the valve is seated.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

Figure 1:
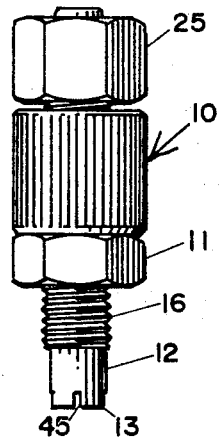
FIGURE 1 is a side elevational view of an anti-fouling anti-syphoning valve constructed in accordance with my invention.
Figure 2:
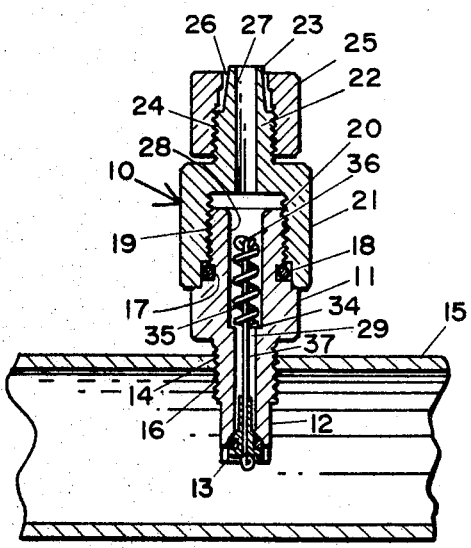
FIGURE 2 is a longitudinal cross-sectional view of my valve shown mounted on a liquid line.

Referring to the drawing wherein like numerals are used to designate similar parts throughout the several views, the numeral 10 refers to my anti-fouling anti-syphoning valve consisting of a main body member 11 with a threaded neck portion 12 terminating at its lower or discharge end in a tip portion 13. The threaded neck portion 12 is adapted to be threaded as at 16 into a bore 14 formed in a pipe line 15 through which a liquid being treated is flowing. The tip portion 13 is positioned well into the body of flowing liquid so that the chemicals being discharged by the valve 10 will be immediately absorbed by the liquid and removed from the position of the valve proper as explained in detail hereinafter.

The upper portion of the main body member 11 is provided with a peripheral slot 17 for receiving an O-ring 18 and threads 19 which extend to the upper end of the main body member 11 receiving companion threads 20 of a connecting member 21.

The connecting member 21, which seats against the O-ring 18 for sealing the juncture therebetween against leakage, is provided with an upwardly extending inlet portion 22 which has a bevelled outer surface 23 and a threaded portion 24. A threaded coupling 25 is threadedly mounted on the threaded portion 24 for flaring and securing the end of a pipe (not shown) against the bevelled inlet 23 by the stepped opening 26 in the coupling 25. The pipe (not shown) secured to the valve 10 by the coupling 25 permits the flow of a chemical from its source to be discharged into the liquid flowing through the pipe 15. To accomplish this, the chemical flows through a passage 27 in the connecting member 21 into an enlarged passage 28 in the main body member 11 which connects with a smaller diametered passage 29. The passage 29 communicates with an enlarged outlet chamber 30 having outwardly tapering side wall 31 at its inner portion which forms a valve seat for a valve member 32. The outer portion of the outlet chamber 30 is provided with cylindrical side walls 33 which permit the chemical to flow in the stream of fluid in the pipe 15 when the valve 32 is open as explained hereinafter. By virtue of the differences in the diameters of the passages 28 and 29, a shoulder 34 is formed which acts as a support for an elongated coil spring 35. The spring 35 whose lower end rests on the shoulder 34 extends upwardly in the passage 28 with the upper end 36 of the coil spring secured to the upper end of a valve stem 37. The valve stem 37 extends downwardly through the valve passages 28 and 29 and the outlet chamber 30 and beyond the tip portion 13 of the valve 10. The free end of the valve stem 37 extends through the valve member 32 and is knotted or otherwise secured as at 38 for operation of the valve member 32. The valve member 32 is provided with a cylindrical body portion 39 slightly smaller in diameter than that of the side walls of the outlet chamber 30 and a peripheral slot 40 on the body portion 39 for receiving an O-ring 41. Extending upwardly from the peripheral slot 40 on the valve member 32 is an inwardly tapered wall 42 which engages the tapered wall 31 of the outlet chamber 30 when the valve member 32 is in a closed position. The valve member 32 terminates at its upper end in a cylindrical portion 43. The side walls 33 of the discharge chamber 30 are provided with a plurality of slots 45 which extend from the tip 13 to approximately the mid-height thereof so that the upper half of the side walls 33 are solid while the lower half have vertical slots 45 through which the chemical fluids maybe discharged from the outlet chamber 30.

Figure 3:
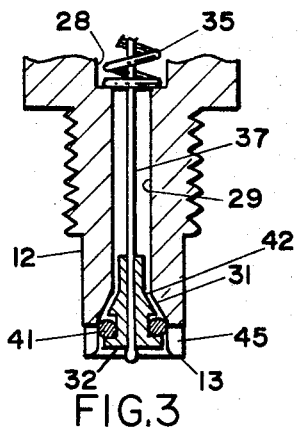
FIGURES 3, 4 and 5 are fragmentary cross sectional views of the valve shown in partially closed, open and completely open positions, respectively.
Figure 4:
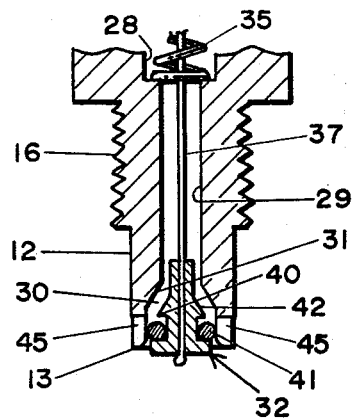

When it is desired to open the valve member 32 in order to inject a chemical into the liquid flowing through the pipe line 15, the chemical is subjected to a pressure equal to or greater than the sum of the pressure of the fluid flowing in the pipe 15 plus the spring pressure 35. As soon as that pressure has been reached, the spring 35 will be compressed and the valve member 32 will start to slide in the outlet chamber 30 in the direction of the tip 13. The O-ring 41 will maintain a perfect seal against the side walls 33 until the O-ring 41 will have arrived at the top edge of the discharge slots 45 as shown by FIGURE 3. When the valve member 32 has brought the O-ring 41 to a position below the top edge of the slots 45, chemical fluid will commence to be discharged through the exposed portions of the slots 45. At this position of the valve member 32 the O-ring 41 bears against and engages the side wall 33 and is supported thereby as the valve body 32 continues to slide downwardly of the discharge chamber 30, greater areas of the slotted portions 45 are exposed and greater volumes of chemical fluids are discharged therethrough at which position the side walls 33 still engage and support the O-ring 41.

Figure 5:
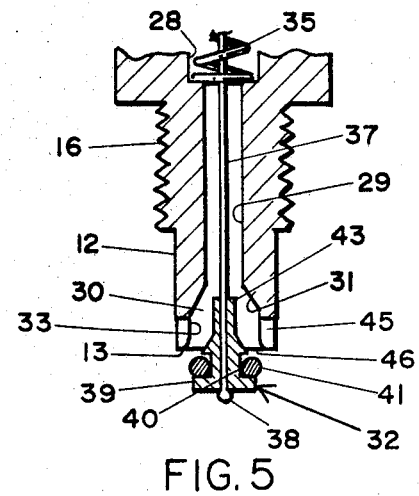

If a relatively large volume of chemical fluid is to be discharged into the pipe line 15, the pressure to which the chemical fluid is subjected will cause the valve member 32 to slide to its completely open position as shown by FIGURE 5. Chemical fluid will now flow through the full length of the slots 45 and also past the tip portion 13 along the space 46 formed between the tip portion 13 and the tapered wall 42 of the valve member 32.

It is readily noted that by the use of the slots 45 there is a reduced pressure exerted by the outward flowing chemical on the O-ring 41 at the moment the valve member 32 is spaced from the tip 13 and the chemical begins to be discharged therethrough. Without the use of the slots 45 to permit an early release of discharge pressure, the pressure of the chemical prior to and at the commencement of discharge past the tip portion 13 will be high. This high pressure impinging on the O-ring 41 is capable of dislodging the O-ring 41 from its slot 40 to render the valve 32 incapable of sealing off the flow of chemical when the valve 32 is later returned to its seated or closed position. None of the liquid flowing through the pipe 15 can flow into the discharge chamber 30 since the chemical flowing through the ducts 27, 28, 29 and chamber 30 has impressed thereon a greater pressure than that of the liquid flowing through the pipe 15. As long as the chemical being dispensed in the liquid in the pipe 15 is subjected to a higher pressure than that of the liquid in the pipe 15, the valve member 32 will remain open and liquid chemical will flow through the valve 10 into the body of liquid flowing past the tip portion 13.

When it is desired to cut off the injection of fluid chemical into the liquid flowing through the pipe 15, the pressure being impressed on the fluid chemical is reduced to an amount less than that of the sum of the pressure of the liquid in the pipe 15 and the coil spring pressure 35. Almost instantaneously, the spring pressure 30 will cause the valve stem 37 and the valve member 32 to retract into the chamber 30 of the valve body 11. However, since the pressure of the chemical still flowing through the outlet 46 and the discharge slots 45 is higher than the liquid pressure in the pipe 15, none of the liquid in the pipe 15 can flow into the valve 10 as stated hereinabove. As the valve 32 continues to slide inwardly, the opening of the outlet 46 is diminished and the volume flow of liquid chemical is decreased until the O-ring 39 engages the side wall 33 of the outlet chamber 30.

The chemical continues to be discharged into the pipe line 15 through the slots 45 that are exposed above the valve member 32. As the valve member continues its movement inwardly of the outlet chamber 30, less of the slots 45 are exposed and the volume flow of chemical is reduced until the O-ring 41 slides past the upper edges of the slots 45 when the flow of chemical is completely ceased. The valve member 32 then slides upwardly until the tapering wall 42 of the valve member 32 engages the tapering wall 31 of the outlet chamber 30 and the O-ring 41 seats tightly against the walls 31, 33 of the outlet chamber 30 to seal off all further flow of chemical through the valve 10.

Since the chemical is being subjected to a fairly high pressure in order to permit the chemical to be discharged into the fluid flowing along the pipe line 15, the pressure exerted on the O-ring 41 at the position of the valve 32 when the O-ring 41 is in close proximity to the valve tip 13 will be high and directed at the O-ring 41. To prevent the danger of the O-ring 41 being forced out of the slot 40, this high pressure is reduced considerably by use of the discharge slots 45 which permit a portion of the chemical to continue to be discharged by the valve 10 until the O-ring 41 becomes engaged by the side wall 33 of the outlet chamber 30. Then with the O-ring secured against any possibility of dislodgement by its continued engagement with the side wall 33 of the outlet chamber 30, the valve member 32 is finally slid to its seated position to cut off outward flow of the chemical.

It has been found, for example, when injecting a high pH chemical into a water containing hardness minerals, the minerals such as calcium will precipitate to soften the water. However, if there existed the slightest amount of feed back or back flow into the valve 10, water flowing into the valve 10 would effect deposits of precipitate within the valve until such time as the valve 34 would become fouled or the outlet 28 blocked off. It has been noted that even after a long period of use of my anti-fouling anti-syphoning injection point valve 10, no sign of precipitate has been found present on any part of the valve member 32.

What I claim as new and desire to secure by Letters Patent of the United States is:

1. An anti-fouling anti-syphoning valve comprising a main valve body having a longitudinally disposed fluid duct, a valve stem extending along said fluid duct, an outlet chamber having a substantially cylindrical side wall communicating with said fluid duct at one end, a valve slidably mounted in said chamber and secured to one end of said valve stem, spring means operatively connected to said valve stem yieldingly urging said valve to a closed position, and a resilient O-ring mounted on said valve and engaging said cylindrical side wall for sealing said outlet chamber at said one end, said cylindrical side wall having a plurality of longitudinally disposed slotted portions extending from the other end of said cylindrical side wall to a position spaced from said one end permitting a discharge of fluid through said slotted portions before said valve arrives at its fully open position.

2. An anti-fouling anti-syphoning valve comprising a main valve body, a neck portion mounted on said main valve body, a tip portion extending outwardly of said neck portion, said tip portion having an outlet chamber, a fluid duct extending along each of said main valve body, said neck portion and said tip portion, said fluid duct communicating with said outlet chamber, said outlet chamber having a substantially cylindrical side wall, a shoulder formed in said fluid duct, a valve stem extending along said fluid duct, a valve slidably mounted in said outlet chamber and secured to one end of said valve stem, a coil spring extending about the other end of said valve stem and positioned on said shoulder, means securing said other end of said valve stem and said coil spring whereby said valve is yieldingly urged to a closed position, said valve having a peripheral groove, and an O-ring mounted in said groove and engaging said cylindrical side wall for sealing said outlet chamber, said cylindrical side wall having a plurality of slotted portions extending longitudinally from said tip portion whereby upon the outward sliding movement of said valve in said outlet chamber, fluid is discharged through said slotted portions prior to said valve arriving at said tip portion.

3. An anti-fouling anti-syphoning valve comprising a main valve body, a neck portion mounted on said main valve body, a tip portion extending outwardly of said neck portion, said tip portion having an outlet chamber, a fluid duct extending along each of said main valve body, said neck portion and said tip portion, said fluid duct communicating with said outlet chamber, said outlet chamber having a substantially cylindrical side wall and an outwardly flaring wall portion connecting said fluid duct and said cylindrical side wall, a shoulder formed in said fluid duct, a valve stem extending along said fluid duct, a valve slidably mounted in said outlet chamber and secured to one end of said valve stem, a coil spring extending about the other end of said valve stem and positioned on said shoulder, means securing said other end of said valve stem and said coil spring whereby said valve is yieldingly urged to a closed position, said valve having a peripheral groove, an O-ring mounted in said groove and engaging said cylindrical side wall and said outwardly flaring wall portion for sealing said outlet chamber, said cylindrical side wall having a plurality of slotted portions extending longitudinally from said tip portion whereby upon the outward sliding movement of said valve in said outlet chamber, fluid is discharged through said slotted portions prior to said valve arriving at said tip portion.

4. An anti-fouling, anti-syphoning valve comprising a main valve body having a longitudinally disposed fluid duct, an outlet chamber having a substantially cylindrical side wall, an outwardly flaring wall portion connecting said fluid duct and said cylindrical side wall at one end of said outlet chamber, a valve slidably positioned in said outlet chamber, said valve having an outwardly flaring body portion mounted on a substantially cylindrical body portion of smaller diameter than that of said outlet chamber, a valve stem extending along said fluid duct with one end secured to said valve, spring means operatively connected to the other end of said valve stem yieldingly urging said valve to a closed position, said cylindrical body portion of said valve having a peripheral groove, an O-ring mounted in said groove, said cylindrical side wall of said outlet chamber having a plurality of longitudinally disposed slotted portions extending from the other end of said outlet chamber whereby upon the outward sliding movement of said valve, fluid is discharged through said slotted portions before said valve is in its fully open position.

References Cited by the Examiner

UNITED STATES PATENTS

| | | | |
|---|---|---|---|
| 2,255,203 | 9/1941 | Wiegand | 137—541 X |
| 2,874,000 | 2/1959 | Nystrom | 239—453 X |
| 2,899,939 | 8/1959 | Norris | 137—625.69 |
| 2,971,526 | 2/1961 | Boyer et al. | 137—223 |
| 3,047,018 | 7/1962 | Lucien | 137—625.69 |

WILLIAM F. O'DEA, *Primary Examiner.*

D. ZOBKIW, *Assistant Examiner.*